United States Patent [19]

Williamson, Jr. et al.

[11] 4,348,217

[45] Sep. 7, 1982

[54] METHOD OF CONTROLLING FILAMENT FORMATION IN A GLASS FIBER BUSHING

[75] Inventors: Kenneth T. Williamson, Jr., Glenshaw; Samuel S. Bruce, Jr., Pittsburgh, both of Pa.; Walter L. Martin, Jr., Lexington, N.C.

[73] Assignee: PPG Industries, Inc., Pittsburgh, Pa.

[21] Appl. No.: 228,445

[22] Filed: Jan. 26, 1981

Related U.S. Application Data

[63] Continuation of Ser. No. 111,753, Jan. 14, 1980, abandoned.

[51] Int. Cl.³ .................................. C03B 37/025
[52] U.S. Cl. ........................................ 65/2; 65/1; 65/4.4; 65/10.2
[58] Field of Search .................... 65/1, 2, 4.4, 10.2

[56] References Cited

U.S. PATENT DOCUMENTS

| | | | |
|---|---|---|---|
| 2,728,699 | 12/1955 | Labino | 65/4.4 X |
| 3,019,078 | 1/1962 | Roberson | 18/54 |
| 3,328,144 | 6/1967 | Glaser | 65/11 |
| 3,328,230 | 6/1967 | Levecque et al. | 65/4.4 X |
| 3,749,638 | 7/1973 | Renaud et al. | 162/145 |
| 3,850,601 | 11/1974 | Stapleford et al. | 65/4.4 X |
| 3,869,268 | 3/1975 | Briar et al. | 65/2 |
| 4,112,174 | 9/1978 | Hannes et al. | 428/220 |
| 4,129,674 | 12/1978 | Hannes et al. | 428/285 |

*Primary Examiner*—Robert L. Lindsay, Jr.
*Attorney, Agent, or Firm*—John E. Curley

[57] ABSTRACT

A bushing is described which permits the formation of filaments of different diameters simultaneously from a single molten glass source by controlling the differential in orifice sizes used in the bushing to minimize process interruptions.

6 Claims, 2 Drawing Figures

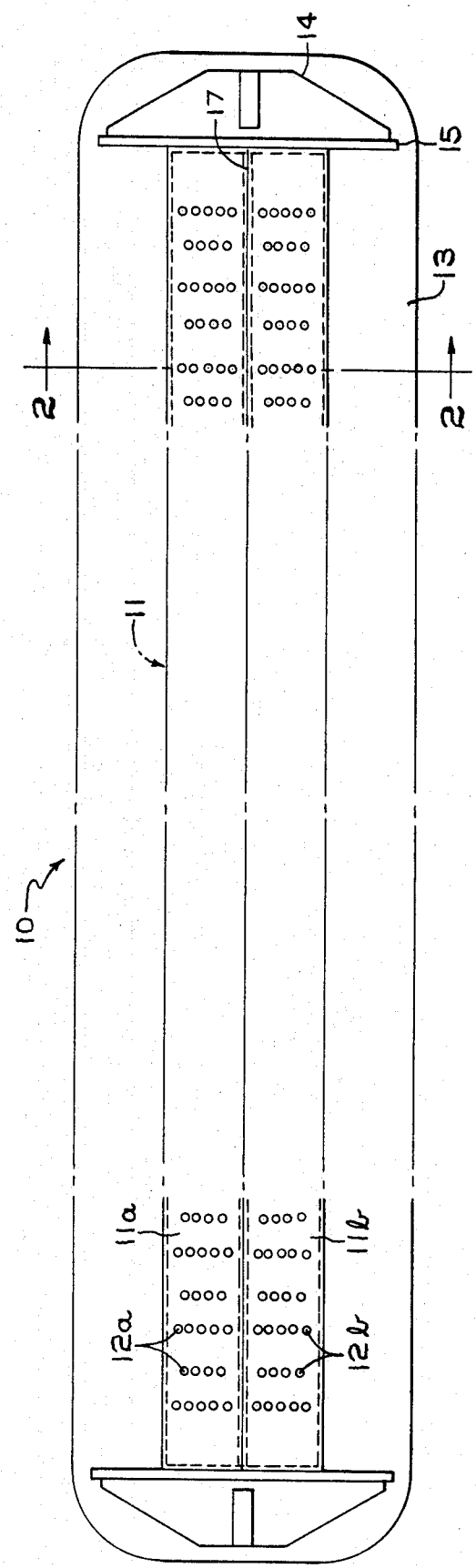
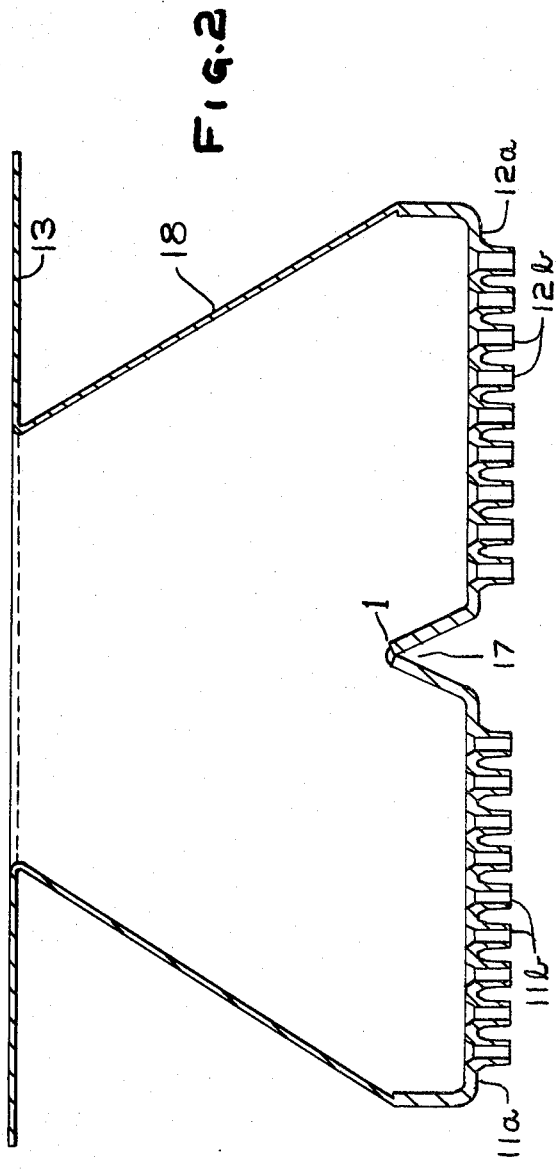

METHOD OF CONTROLLING FILAMENT FORMATION IN A GLASS FIBER BUSHING

This is a continuation of application Ser. No. 111,753, filed Jan. 14, 1980 now abandoned.

BACKGROUND OF THE INVENTION

In the manufacture of glass fibers a molten glass is typically drawn from a precious metal container called a bushing in the art through a plurality of orifices located in the bottom of the container. The container is electrically heated to maintain the glass in it in the molten state. The glass filaments drawn from the orifices are gathered together in strand form and wound on mandrels at high speed to collect a strand product, or they are attenuated in chopping devices which chop the strands into various lengths and which are then packaged and sold as chopped fibers. In the manufacture of shingles utilized for asphalt roofing products glass fibers have begun to enjoy success as the reinforcement material replacing the formerly used organic rag felts and asbestos products which have been used in the past. It has been common practice in the art to use chopped glass fibers to manufacture fibrous glass mats as a replacement for the rag felts and asbestos felts previously employed and in doing this it has also been common practice in the art to utilize glass fibers of varying lengths in a given mix as an aqueous dispersion for the preparation of such fibrous mats. Two patents which typify the art of utilizing fibrous mats having various diameter fibers in the mats and having varying lengths are the inventions described in U.S. Pat. Nos. 4,112,174 and 4,129,674. It has also been described in U.S. Pat. No. 3,749,638 that varying fiber lengths for a given fiber glass diameter may be employed in the utilization of glass fibers for the preparation of glass mats.

In the normal glass fiber producing operation the bushings are generally rectangular or circular shaped containers having a multiplicity of orifices located on the bottom of them. In fabricating the bushings the orifices are controlled in diameter to insure that each orifice is of the same size so that a glass fiber of a given diameter can be produced from that bushing. All of the filaments produced from each of the orifices as the glass is withdrawn from the container thus have precisely the same diameter since they are being attenuated with either a chopping device or a winder at the same speeds for a given bushing temperature. In view of the recent increase in use of glass fibers in the mat making area for roofing products and in view of the fact that mixed filament diameter fibers are being employed in that use, it is desirable to produce in a single bushing a desired product mix of fibers having two different diameters for utilization in producing mat products from these mixed diameter filaments. Thus, there is a need to provide a bushing capable of producing glass fibers which will achieve this result.

THE PRESENT INVENTION

In accordance with the present invention a glass fiber forming bushing is provided which can provide on a continuing basis glass fibers of different diameters from the same bushing and which can be adapted to a normal forming position utilized to chop glass fibers continuously during forming and provide a mixed glass fiber product in which the glass fibers contain given weight percentages of fibers of varying diameter.

In accordance with the instant invention an elongated generally rectangular bushing is provided which is provided with aligned rows of orifices across its width and in which the bushing is divided to provide on the front end of the bushing, i.e. that portion of the bushing that is located in front of the power transformer supplying the electrical power to the bushing, a plurality of orifices of a given size and wherein the second half of the bushing is provided with similarly aligned rows of orifices which are in alignment with the front rows but are provided with holes of a larger size than those contained on the front half of a bushing. The orifices between the front and the back of the bushing are controlled in diameter so that difference in diameter between the orifices in the front and the orifices in the back is maintained between 0.0215 to 0.0165 inch difference. Thus, in a fiber glass bushing in which M fibers and G fibers are produced simultaneously, the front row of orifices have an orifice size of 0.048 inch and the orifices in the back half of the bushing have an orifice size of 0.067 inch.

For a more complete understanding of the invention reference is made to the accompanying drawings in which FIG. 1 is a plan view of a bushing looking up from the bottom, and FIG. 2 is a side elevation of the bushing of FIG. 1.

As can be seen from the accompanying drawings, the bushing, normally fabricated of a precious metal such as platinum or platinum-rhodium alloy, is comprised of sidewalls 18 and a bottom 11. The bottom 11 is divided into two generally symmetrical halves 11a and 11b. The section 11b is the front of the bushing, that portion of the bushing that is farthest away from the power transformer feeding power to the bushing and section 11a is the back half of the bushing. Referring in particular to FIG. 1, a plurality of rows of carefully designed orifices 12b are provided in aligned rows across the entire bottom of the bushing. Similarly in the back half of the bushing a second set of carefully aligned rows of orifices 12a are provided along the back half of the bushing. The rows of orifices 12a and 12b are in alignment with each other so that the fin shield cooling devices normally employed to cool glass coming from the bushing tips 12a and 12b can be inserted between the rows in the normal manner used in the art. The bushing is provided with a flange 13 for mounting of the bushing in a castable refractory on a bushing frame to hold the bushing firmly up against ceramic bushing blocks connected to a furnace forehearth through which glass flows into the bushing. The bushing is provided on either end with a terminal 14 which is fixed to plate 15 along the extremities of the bushing for utilization in connecting the bushing through the terminal 14 to a suitable power source, i.e. a transformer, not shown, so that the bushing can be heated while in use to maintain glass contained in it in the molten state. The center of the bushing is provided with a ridge 1 formed of the metal forming the bushing bottom and the groove 17 formed by the element 1 is normally filled with refractory material to thermally insulate that section of the bushing. A cooling tube is also often employed in groove 17 to provide cooling in that section of the bushing to prevent sagging.

In providing the orifices 12a and 12b on the bottom of the bushing, care must be taken in designing the bushing to provide a sufficient number of small filaments to large filaments to provide the desired product mix and to insure that adequate production of the large fiber versus the small fibers will result when operating the bushing. In order to prevent frequent interruption of the bushing operation it is important that careful consideration be given to the relative difference in diameter between the orifices 12a and 12b. Thus, it has been found that by maintaining this difference in diameter between the small orifices and the large orifices at values that do not exceed 0.0215 to 0.0165 inch, satisfactory operation can be achieved. When these parameters are not followed, it has been found that considerable difficulty is encountered in running the bushing properly to insure that the fine fiber will be produced since there is a tendency in utilizing mixed bushings for the small fiber material to be produced at a temperature not normal for that fiber and thus excessive tension is introduced into the bushing when the smaller fibers are attenuated. By operating within the parameters set forth above and preferably within a range of 0.02 inch to 0.018 inch difference in orifice size satisfactory bushing operation can be accomplished and the fine fiber can be produced even though the bushing temperature may not be optimum for that particular fiber.

To further illustrate the instant invention the following examples are given to illustrate maintenance of the orifice sizes within the parameters herein discovered for optimum operation of a mixed bushing.

EXAMPLE I

A 2,200 tip bushing was constructed in accordance with the general configuration shown in FIGS. 1 and 2 herein and in which the large hole diameter was 0.067 inches and the small diameter 12b holes were set at 0.027 inches 1100 orifice of each size were used. This bushing was operated at conventional forming temperatures and the filaments emanating from the bushing were attenuated at bare glass pull rate of about 97 pounds per hour. The bushing was constantly interrupted by small diameter filaments being broken and excessive flooding of the bushing faceplate occurred so that the bushing could not be operated for any sufficient period of time to accumulate adequate quantities of product.

EXAMPLE II

An identical bushing was constructed in which the orifices 12a and 12b were precisely sized utilizing the parameters of the instant invention. Thus, the 1100 large orifices 12a employed were of a diameter of 0.067 inch while the 1100 small orifices employed were designed at diameters of 0.048 inch which represented a difference between the large and small diameter holes of 0.019 inches. This bushing was operated under the same temperature conditions and at the same rate of pull as the bushing of Example I and the bushing ran well for a continuous period of time until 10,000 pounds of product were accumulated. A chopping unit similar to the chopping unit shown in FIG. 2 of U.S. Pat. No. 3,869,268 was utilized to cut the fibers. Operating in this fashion, the 1,000 pounds of material collected contains 75 percent by weight M fibers and 25 percent by weight G fibers. The bushing was not subject to any interruptions more than those normally encountered in operating a normal commercial bushing of this size containing orifices which are all identical. Thus, the bushing performed satisfactorily and produced a mixed product which contained a good mixture of materials for utilization in forming glass paper mats.

While the invention has been described with reference to certain specific examples and illustrative embodiments, it is not intended to be limited thereby except insofar as appears in the accompanying claims.

We claim:

1. A method of controlling the formation of filaments from a molten glass source in a fiber forming bushing comprising establishing in the bushing at least two groups of orifices, the orifices in each of the groups having different diameters, pulling glass fibers from each group of orifices simultaneously and chopping the fibers into discrete lengths as they are being pulled, and controlling the formation and pulling of the glass fibers to minimize interruption by maintaining the difference in orifice size in any two groups between 0.0215 to 0.015 inch.

2. The method of claim 1 where the differences in the orifice diameter are controlled between 0.021 to 0.018 inch.

3. The method of claim 1 wherein one group of orifice is maintained at diameter of 0.067 inch and a second group of orifices is maintained at 0.048 inch.

4. A method of controlling the formation of filaments from a fiber forming bushing comprising continuously pulling glass fibers from a bushing from at least two groups of orifices, each group of orifices being controlled to provide orifices of the same size in each group, controlling the diameter of the orifices in one group to maintain the orifices at a diameter different than the other group while controlling the magnitude of the difference between 0.0215 to 0.015 inch, and collecting the filaments formed from each group of orifices at the same pulling speed.

5. The method of claim 4 wherein the orifices of one group are 0.067 inch in diameter and the orifices of a second group are at 0.048 inch.

6. The method of claim 4 wherein the difference in diameter of the groups of orifices is maintained between 0.021 inch and 0.018 inch.

* * * * *